United States Patent
Varady et al.

(10) Patent No.: US 6,313,625 B1
(45) Date of Patent: Nov. 6, 2001

(54) MAGNETIC ROTARY POSITION SENSING

(75) Inventors: Arthur Joseph Varady, Chelsea; John Michael Kacewicz, Riverview; Robert Joseph Dalbo, Allen Park; Sheran Anthony Alles, Westland; Thomas J. Hermann, Troy, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/232,607

(22) Filed: Jan. 19, 1999

(51) Int. Cl.[7] ................................ G01B 7/30; G01P 3/48
(52) U.S. Cl. ................... 324/207.25; 324/207.22; 324/173; 324/207.12
(58) Field of Search ..................... 324/207.12, 207.13, 324/207.15, 207.25, 161, 162, 166, 173, 207.22

(56) References Cited

U.S. PATENT DOCUMENTS

| | | |
|---|---|---|
| 5,086,272 | 2/1992 | Hinrichsen .................. 324/207.13 |
| 5,107,213 | 4/1992 | Ponticelli et al. ............. 324/207.25 |
| 5,264,789 | 11/1993 | Braun et al. ..................... 324/165 |
| 5,430,370 | 7/1995 | Rooke .......................... 324/207.12 |
| 5,559,705 | 9/1996 | McClish et al. ............... 364/431.07 |
| 5,606,252 | 2/1997 | Gschossmann et al. ............. 324/166 |
| 5,789,658 | * 8/1998 | Henn et al. ....................... 73/1.37 |
| 6,012,427 | * 8/1998 | Hoy et al. ...................... 123/406.5 |

* cited by examiner

Primary Examiner—Benjamin R. Fuller
Assistant Examiner—Henry S. Andersen
(74) Attorney, Agent, or Firm—Carlos L. Hanze

(57) ABSTRACT

A rotational sensing assembly including a ferromagnetic sensor wheel rotationally fixed to a shaft having a tooth pattern including a missing tooth. An inductive sensor is mounted adjacent the periphery of the sensor wheel and in communication with a processor. The sensor produces a generally sinusoidal signal in response to the wheel rotation, with voltage zero crossings that are time stamped by the processor. The geometry of the sensor wheel around the missing tooth location is altered to equalize the induced voltage in the sensor for fixed time intervals in order to maintain proper timing of the zero crossings in the sensor signal.

19 Claims, 2 Drawing Sheets

MAGNETIC ROTARY POSITION SENSING

FIELD OF THE INVENTION

The present invention relates to magnetic rotary sensing systems, and more particularly to improved accuracy in rotary sensing when employing a toothed wheel. This patent application is related to co-pending patent application titled METHOD FOR IMPROVED ROTATION POSITION SENSING, filed herewith.

BACKGROUND OF THE INVENTION

For rotating members, in particular rotating shafts, it is sometimes necessary to receive accurate rotational information, which may be rotational position, velocity, and acceleration information. Various sensing systems have been developed to accomplish this task.

One sensing system in particular that works well in relatively harsh environments, such as with a crankshaft of an internal combustion engine, is a toothed sensor wheel. For this particular sensing system, the wheel is ferromagnetic and an inductive (magnetic field) sensor is located near the wheel periphery. As the wheel rotates, the teeth pass by the sensor, changing the magnetic field. The information is then communicated to a processor via a generally sinusoidal voltage signal from the sensor. This works generally well since it is non-contact—there are no rubbing parts to wear out, dirt and oil won't generally interfere with the signal, and the temperature effects are minimal. Generally the sensor wheel will have a series of teeth that are the same size and evenly spaced circumferentially about the wheel, with one of the teeth missing. The missing tooth location will provide a gap for indexing, to determine the absolute rotational position. This information can then be used for generally controlling engine operating parameters, such as ignition timing, fuel injector timing, etc.

While the information provided by the sensor system is sufficient for conventional internal combustion engines, the need arises to increase the accuracy of readings for this type of system in order to obtain more precise engine operation information. An example of such an instance is the desire to use a toothed crankshaft sensor wheel to detect engine cylinder misfires. It must be very precise because the slight acceleration of the crankshaft due to a cylinder firing must be determined. For this type of calculation, as little as 10 microseconds error may be too much to obtain the desired accuracy.

In general the toothed wheel sensor system produces a sinusoidal signal that has periodic zero crossings (i.e. where the voltage is zero). These zero crossings are subsequently used for determining the rotational information needed for misfire detection. The sinusoidal signal is sent to a processor for generation of a square wave from which edges are time stamped for further digital signal processing as part of a misfire monitor.

An accuracy concern arises however around the location of the missing tooth. For these inductive sensors, the missing tooth location provides for a different rate of change in magnetic flux linkage than do the other teeth on the wheel, so that residual stored energy will occur due to the loss of this flux coupling at the location of the missing tooth. The additional energy is stored in the inductor of the sensor and decays based on the particular sensor and input circuit characteristics. This residual energy will then result in higher voltages, affecting the signal for a few teeth past the gap as the excess energy decays, inherently causing a time delay in the zero crossing of the signal and hence increases the variation in the edge placement for the square waves which are subsequently generated. This, then, results in inaccurate time stamp data at these locations. The need arises then for compensation in the signal due to the energy storage in the inductive sensor One method of correction employed is to take the signal from the sensor as is, with the error, and employ software in a signal processor to manipulate the signal in order to compensate for the error. However, the accuracy can be less than satisfactory since the correction is based on operation at a given operating speed to minimize the software complexity, and as the rotational speed varies from the given speed, the accuracy of the error correction is reduced.

Thus, it is desirable to assure accuracy in the signal initially sent from the inductive sensor, (i.e. reduce the error at the source), and avoid the need for the error compensation in the software of the signal processor in order to obtain accurate rotational acceleration data from a sensor wheel.

SUMMARY OF THE INVENTION

In its embodiments, the present invention contemplates a rotational position sensing system for determining the rotational characteristics of a rotatable shaft. The sensing system includes a sensor wheel rotationally fixed to the shaft about a center of rotation, being made of a ferromagnetic material, and including n minus 1 teeth generally equally spaced about a periphery of the wheel at intervals of 360 divided by n degrees, thereby creating a gap. Each of the teeth has a leading face and a trailing face, creating a land between the leading face of each tooth and the trailing face of an adjacent tooth. A magnetic induction sensor is mounted proximate the outer periphery of the sensor wheel for creating a periodic signal in response to teeth passing thereby, with a processor receiving the signal from the sensor. The sensor wheel further includes flux adjustment means, located generally adjacent the gap, for altering the timing of the periodic signal created by the sensor when passing thereby.

Accordingly, an object of the present invention is to provide for an inductive sensing system employing a toothed ferromagnetic wheel mounted on a shaft wherein the geometry of the wheel is changed around a missing tooth location in order to correct the signal from the inductive sensor, resulting in accurate rotational position and acceleration determinations.

An advantage of the present invention is improved accuracy of the sensor signal without the need for electrical filtering of the signal by the signal processor.

An additional advantage of the present invention is that the signal correction is affective for all rotational speeds.

DETAILED DESCRIPTION OF THE PREFERRED EMBODIMENTS

Figure 1:
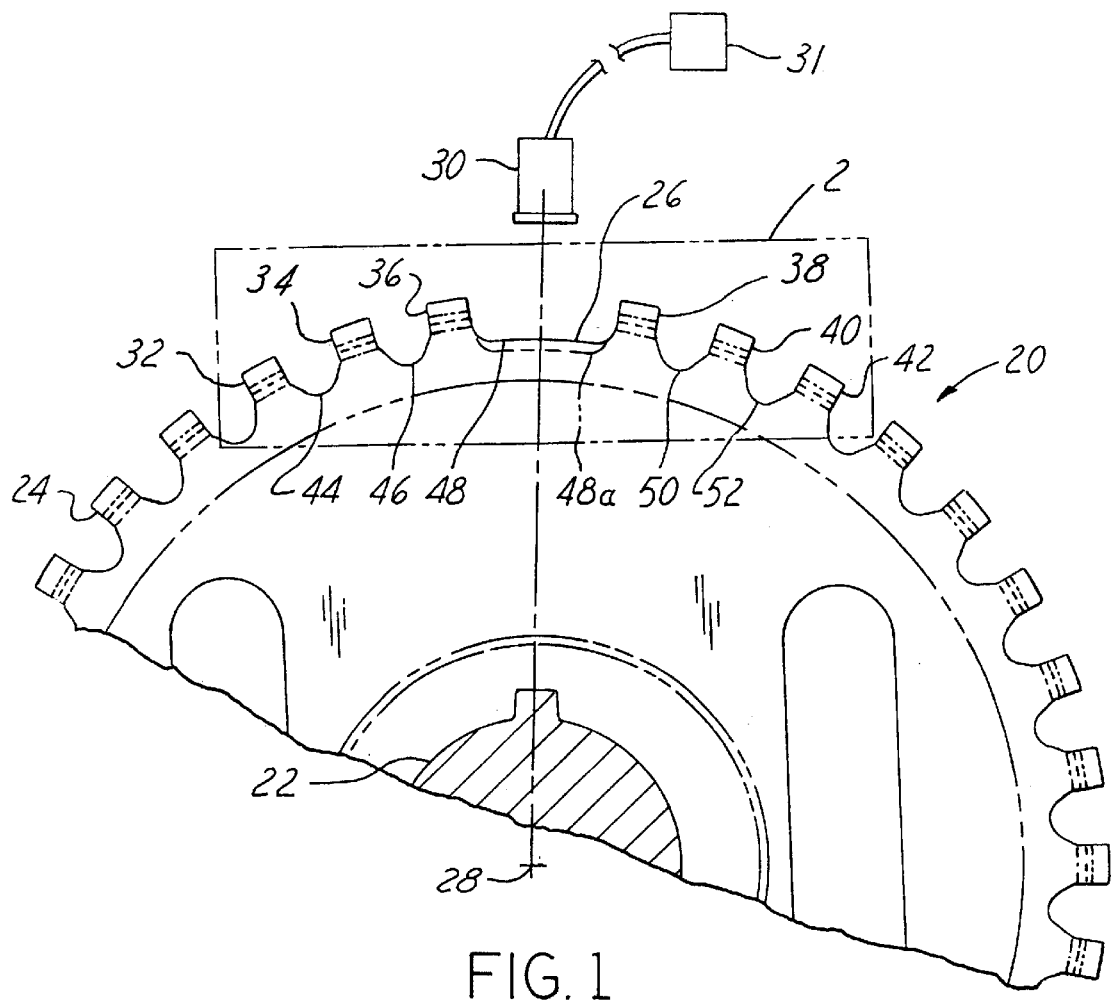
FIG. 1 is a view of a magnetic field sensor and a portion of a toothed sensor wheel connected to a rotary shaft in accordance with the present invention.
Figure 2:
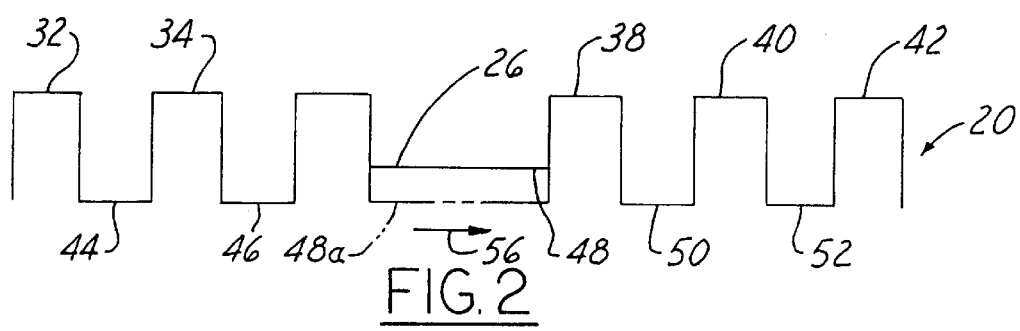
FIG. 2 is a schematic illustration, on an enlarged scale, of a portion of the toothed wheel shown in encircled area 2 in FIG. 1.

FIGS. 1 and 2 illustrate a sensor wheel 20 rotationally affixed to a rotating shaft 22. For purposes of this discussion, the shaft will be assumed to be a crankshaft employed in an internal combustion engine. The sensor wheel 20 includes a set of thirty six minus one teeth 24. By this it is meant that the tooth size and spacing is such that the leading edge of each tooth in the set 24 is ten degrees spaced from the leading edge (or trailing edge) of each of its adjacent teeth, with one tooth missing, thus making one gap 26 that has twenty degrees from the leading edge of one tooth to the next. While a configuration of 36-1 teeth is shown, there can be other numbers of teeth on the wheel, as desired for the particular application. The sensor wheel 20 is made of a ferromagnetic type of material so that the teeth will influence any particular magnetic field that they are passing through.

Mounted adjacent to the outer periphery of the wheel 20 is an inductive (magnetic field) sensor 30. This sensor 30 communicates with a processor 31 that will receive the data and convert it to rotational information, such as rotational position, velocity, and acceleration. The magnetic field sensor 30 may, for example, be a Hall Effect sensor, a variable reluctance sensor, or a magnetoresistive or magnetorestrictive sensor.

In accordance with the present invention there are specific teeth within the set 24 that may have varied geometries, generally located adjacent the gap 26. For the discussion herein, six teeth will be specifically discussed and will be labeled with element numbers 32–42. Also, the valleys, i.e. bottom lands, around these six teeth will be labeled with element numbers 44–52 for discussion herein. The rotation direction of the wheel 20 is indicated by arrow 56.

In general, all of the teeth 24 about the wheel 20 have the same height, so that the lands are at the same radial distance from the center of rotation 28 of the wheel 20. This center of rotation 28 is also the axis about which the shaft 22 rotates. Thus lands 44, 46, 50, and 52 are at the same radial distance. But there is an exception for the land 48 in the gap 26. The land 48 is radially farther from the center of rotation 28 than it normally would be, illustrated by phantom line 48*a*. What this does is provide extra ferromagnetic material to affect the magnetic flux in the area of the missing tooth without giving a false reading of a tooth in that location. The resulting effect will be discussed below in relation to the sensor system operation.

The sensor system operates generally at all times while the shaft 22 is rotating. As the shaft 22 rotates, the sensor wheel 20 rotates with it, causing the teeth 24 to pass by the inductive sensor 30. As each tooth passes, it alters the magnetic flux path relative to the gap just preceding that tooth. This variation in magnetic flux is detected by the sensor 30, and transmitted as a signal to the processor 31. Because of the alternating between tooth and gap, a generally sinusoidal signal is created.

The sinusoidally varying signal, that is sent to the processor 31 will be manipulated. The times at which the sinusoidal signal has zero crossings (i.e. where zero voltage occurs in the sinusoidal signal) is used to determine rotary information. This signal provides at least two different types of information from the same sensor 30 and sensing wheel 20. The first type is used for the timing in general. The timing between the zero crossings of the sinusoidal signal is monitored by the processor 31, and when a relatively long time between crossings occurs, the processor will recognize this as the gap 26 for the missing tooth, thus giving absolute rotational position of the crankshaft 22 (i.e., the crank angle). This is the conventional use for the sensing system.

The second type of information from the signal is the timing between the zero crossings, employed by the microprocessor 31 to determine the rotational velocity. By time stamping the positions, the rotational velocity can be determined. Further, by knowing the timing of the zero crossings, changes in time between zero crossings is used by the processor 31 to determine rotational acceleration. The rotational acceleration information is needed in order to employ this sensing system as a cylinder misfire detector. By reading the rotational acceleration information, the processor 31 will be able to note whether each cylinder in the engine is firing properly, because as each cylinder fires during a combustion event, the crankshaft 22 will experience a slight acceleration. If the acceleration that should occur for a given cylinder combustion event is missing, then the processor 31 will recognize this and indicate such to, for example, a main engine control computer, not shown.

With such precise sensing needed, the concern then arises around the missing tooth location. A first preferred step is to read the sensor signal for every other tooth, i.e. every twenty degrees, which will generally provide enough data points, while avoiding attempts to read the signal at the missing tooth location.

The sensor wheel 20 of the present invention also corrects for error around the missing tooth that would otherwise be due to the residual energy stored in the sensor 30. The difference in the radial location of the third land 48 relative to the other lands changes the geometry, and thus the magnetic flux path around the missing tooth location. The radial location of the land 48 is adjusted outward relative to the other lands so that the flux path around the missing tooth location is changed to equalize the induced emf (voltage) for fixed time intervals to match that for the rest of the sensor wheel 20. Put another way, this geometry will generally achieve a constant length flux path through the same permeability. The exact amount of adjustment depends upon several factors, including the shape and spacing of the teeth and the type of magnetic sensor employed (i.e. the electromagnetic characteristics of the sensor employed). The concern is not with the change in the shape of the sinusoidal signal, just with the timing of the zero crossings.

The radial location of the land provides a means for substantially eliminating the variation in the zero crossing timing due to the increased energy storage in the inductive sensor 30 at the gap 26, which in turn, reduces variation in the edge placement for the square waves generated from these zero crossings by the processor 31. This results in improved accuracy around the missing tooth location, resulting in improved misfire detection at this angle of crankshaft rotation.

Figure 3:
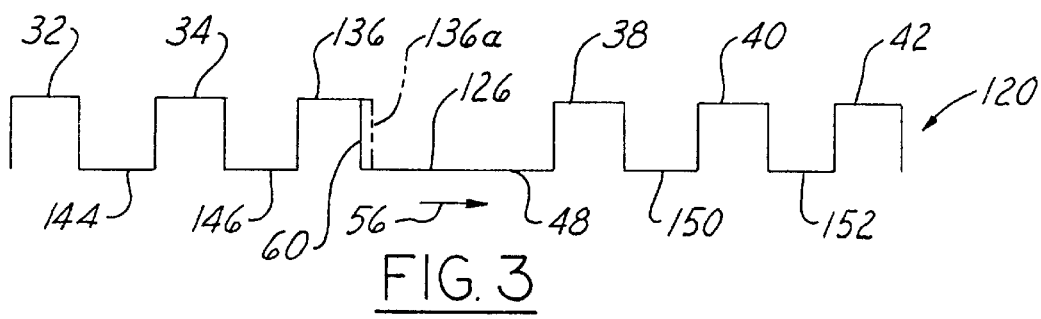
FIG. 3 is a view similar to FIG. 2, but illustrating a different embodiment of the present invention.

FIG. 3 illustrates six teeth of an alternate embodiment of the sensor wheel 120. For this embodiment, similar elements are similarly designated with the first embodiment, while changed elements are designated with a 100-series number. The depth of the land 48 in the gap 26 is the same for this embodiment as for the first embodiment. But the lands 144, 146, 150, 152 etc. between the other teeth 24 are now radially equal to the land 48. Otherwise, the teeth 32, 34, 38, 40 and 42 are the same as in the first embodiment. The tooth 136, though, is now narrower, with material removed from its leading edge 60. What was the full width tooth is indicated by phantom line 136*a*.

The tooth 136 corrects for the error in the zero crossings around the missing tooth by changing the flux path immediately after the gap 126. The flux path is changed in two ways, first the leading face 60 of the tooth is cut back creating a slight delay in time before the tooth 136 affects the sensor signal, and it is a narrower tooth, also affecting the flux path. These changes to the tooth 136 consequently change the timing of the zero crossing for the signal, correcting for the error introduced by the missing tooth location.

Figure 4:
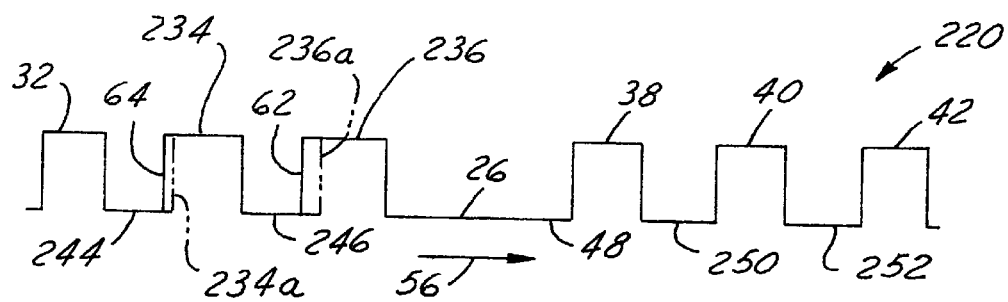
FIG. 4 is a view similar to FIG. 2, but illustrating another embodiment of the present invention.

FIG. 4 illustrates another alternate embodiment of the present invention showing six teeth of the sensor wheel 220. For this embodiment, similar elements are similarly designated with the first embodiment, while changed elements are designated with a 200-series number. The radial distance to the lands 244, 246, 250, 252 are the same as the land 48 in the gap 26; otherwise the teeth 32, 38, 40, 42 are the same. But the two teeth 234, 236 immediately trailing the gap 26 are varied in order to correct the timing of the zero crossings in the signal.

Tooth 236 is wider than the other teeth and has a trailing face 62 that is rotationally rearward of the location for the rest of the teeth. What the normal tooth width would be is indicated in phantom by trailing face 236a. Also, tooth 234 is wider than the other teeth, but narrower than tooth 236, with a trailing edge 64 behind the typical tooth, as indicated in phantom by face 234a. By pulling these trailing faces 62, 64 rotationally rearward, the zero crossings for the teeth trailing the gap 26 are corrected. This embodiment shows that one may wish to alter geometry of more than one tooth in order to assure the desired accuracy in the zero crossings since the residual effect in the sensor may not correct itself until several teeth have passed.

Figure 5:
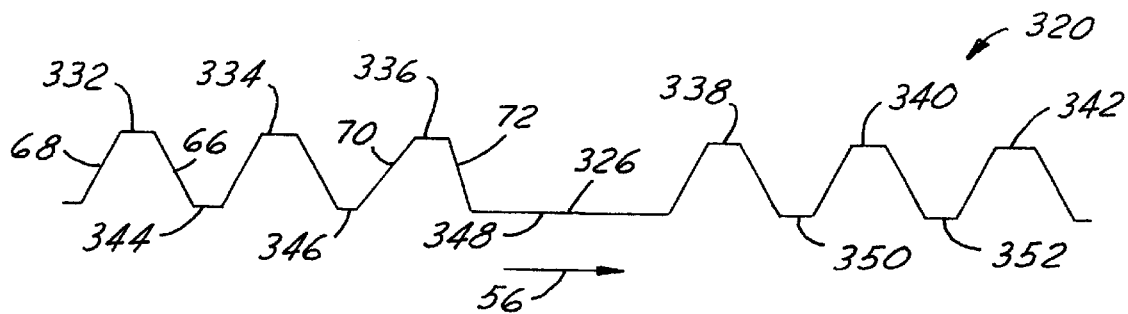
FIG. 5 is a view similar to FIG. 2, but illustrating still another embodiment of the present invention.

FIG. 5 illustrates yet another alternate embodiment of the present invention, similar to FIG. 2, illustrating six teeth of a sensor wheel 320. For this embodiment, those elements that are altered from the first embodiment will be designated with a 300-series number. For this sensor wheel 320, the sensor teeth 332, 334, 338, 340, 342 have angled leading and trailing faces 66, 68, respectively, while the lands 344–352 are all at the same radial distance. This embodiment illustrates a sensor wheel 320 wherein all of the teeth have sloped faces.

In order to correct the flux path to obtain the desired zero crossings, the slope of the leading 72 and trailing 70 face for the tooth 336 on the trailing side of the gap 326 are modified. For the leading face 72, it has a greater slope to provide for a smaller tooth and delayed timing for the sensor detecting the leading edges of the tooth 336. For the trailing face 70, it has a lesser slope to provide for larger tooth 336. These changes to the tooth geometry about the gap 326 will correct for the zero crossing error in the signal due to the missing tooth location.

Of course, while the different embodiments have illustrated individual aspects of a sensor wheel that can be changed to correct the magnetic characteristics in order to obtain the proper timing of zero crossings in the signal, a combination of these variations in tooth geometry and lands can be used to make this correction, if so desired. Also, for example, the wheel may be formed from different materials, where the material adjacent the gap is different than in the rest of the sensor wheel, thereby correcting the magnetic characteristics in order to obtain the desired timing. Thus, while certain embodiments of the present invention have been described in detail, those familiar with the art to which this invention relates will recognize various alternative designs and embodiments for practicing the invention as defined by the following claims.

We claim:

1. A rotational position sensing system for determining the rotational characteristics of a rotatable shaft, the sensing system comprising:

a sensor wheel rotationally fixed to the shaft about a center of rotation, being made of a ferromagnetic material, and including n minus 1 teeth generally equally spaced about a periphery of the wheel at intervals of 360 divided by n degrees, thereby creating a gap, each of the teeth having a leading face and a trailing face, creating a land between the leading face of each tooth and the trailing face of an adjacent tooth;

a magnetic induction sensor, mounted proximate the outer periphery of the sensor wheel for creating a periodic signal in response to teeth passing thereby, the periodic signal being a generally sinusoidal voltage including zero crossings;

a processor for receiving the signal from the sensor; and the sensor wheel further including flux adjustment means, located generally adjacent the gap, for altering the timing of the periodic signal created by the sensor when passing thereby to eliminate variations in timing of the zero voltage crossings.

2. The sensing system of claim 1 wherein the processor includes means for converting the zero voltage crossings of the sinusoidal voltage into a square wave signal and means for assigning a time to each of the zero voltage crossings.

3. The sensing system of claim 1 wherein the flux adjustment means comprises the land in the gap being radially farther from the center of rotation than the lands between the other teeth on the sensor.

4. The sensing system of claim 1 wherein the sensor wheel further includes a predetermined direction of rotation and wherein the flux adjustment means comprises a first tooth of the teeth, adjacent to and rotationally trailing the gap, which has a geometry that is different from the other teeth on the sensor wheel.

5. The sensing system of claim 4 wherein the different geometry of the first tooth comprises the leading face that is cut back, thereby increasing the gap on the sensor wheel.

6. The sensing system of claim 4 wherein the geometry of the first tooth comprises a trailing face that is extended, thereby increasing the width of the first tooth.

7. The sensing system of claim 6 wherein the flux adjustment means further comprises a second tooth of the teeth, adjacent to and rotationally trailing the first tooth, which has a geometry that is different from the other teeth on the sensor wheel.

8. The sensing system of claim 7 wherein the different geometry of the second tooth comprises a trailing face that is extended, thereby increasing the width of the second tooth.

9. The sensing system of claim 4 wherein the flux adjustment means further comprises a second tooth of the teeth, adjacent to and rotationally trailing the first tooth, which has a geometry that is different from the other teeth on the sensor wheel.

10. The sensing system of claim 4 wherein the different geometry of the first tooth comprises the leading face having an angle that is greater than the other teeth on the sensor wheel.

11. The sensing system of claim 4 wherein the different geometry of the first tooth comprises the trailing face having an angle that is less than the other teeth on the sensor wheel.

12. The sensing system of claim 1 wherein the number n is 36, thereby having 36 minus 1 teeth on the sensor wheel.

13. The sensing system of claim 1 wherein the sensor wheel is adapted to mount to a crankshaft of an internal combustion engine.

14. The sensing system of claim 1 wherein the sensor is a variable reluctance sensor.

15. The sensing system of claim 1 wherein the sensor is a Hall Effect sensor.

16. An internal combustion engine crankshaft assembly comprising:

a crankshaft;

a sensor wheel rotationally fixed to the crankshaft about a center of rotation, being made of a ferromagnetic material, and including n minus 1 teeth generally equally spaced about a periphery of the wheel at intervals of 360 divided by n degrees, thereby creating a gap, each of the teeth having a leading face and a trailing face, creating a land between the leading face of each tooth and the trailing face of an adjacent tooth;

a magnetic induction sensor, mounted proximate the outer periphery of the sensor wheel for creating a periodic signal in response to teeth passing thereby, the periodic signal being a generally sinusoidal voltage including zero voltage crossings;

a processor for receiving the signal from the sensor; and the sensor wheel further including flux adjustment means, located generally adjacent the gap, for altering the timing of the periodic signal created by the sensor when passing thereby to eliminate variations in the timing of the zero voltage crossings.

17. The crankshaft assembly of claim 16 wherein the flux adjustment means comprises the land in the gap being radially farther from the center of rotation than the lands between the other teeth on the sensor wheel.

18. The crankshaft assembly of claim 16 wherein the sensor wheel further includes a predetermined direction of rotation and the flux adjustment means comprises a first tooth of the teeth, adjacent to and rotationally trailing the gap, which has a geometry that is different from the other teeth on the sensor wheel.

19. A rotational position sensing system for determining rotational information of a rotatable shaft, the sensing system comprising:

a sensor wheel rotationally fixed to the shaft about a center of rotation, being made of a ferromagnetic material, and including n minus 1 teeth generally equally spaced about a periphery of the wheel at intervals of 360 divided by n degrees, thereby creating a gap, each of the teeth having a leading face and a trailing face, creating a land between the leading face of each tooth and the trailing face of an adjacent tooth;

a variable reluctance sensor, mounted proximate the outer periphery of the sensor wheel for creating a periodic signal in response to teeth passing thereby, with the periodic signal being a generally sinusoidal voltage including zero voltage crossings;

a processor for receiving the signal from the sensor; and the sensor wheel further including flux adjustment means, located generally adjacent the gap, for altering the timing of the periodic signal created by the sensor to eliminate variations in timing for the zero voltage crossings when passing thereby.

* * * * *